United States Patent
Hann et al.

(10) Patent No.: US 6,381,245 B1
(45) Date of Patent: Apr. 30, 2002

(54) METHOD AND APPARATUS FOR GENERATING PARITY FOR COMMUNICATION BETWEEN A PHYSICAL LAYER DEVICE AND AN ATM LAYER DEVICE

(75) Inventors: William Patrick Hann, Round Rock; Matthew G. Irvin, Austin; Richard L. House, Round Rock; William Keith Brewer, Austin, all of TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/148,582

(22) Filed: Sep. 4, 1998

(51) Int. Cl.[7] .............................................. H04L 12/26
(52) U.S. Cl. ................................... 370/395.6; 370/469
(58) Field of Search ................................ 370/392, 395, 370/469, 903, 905, 395.6; 714/48, 52, 758, 799, 800, 801, 802, 805

(56) References Cited

U.S. PATENT DOCUMENTS

| | | | |
|---|---|---|---|
| 3,532,827 A | 10/1970 | Ewin ............................ | 179/18 |
| 3,821,484 A | 6/1974 | Sternung et al. ......... | 179/18 EB |
| 4,002,849 A | 1/1977 | Kotler et al. ............ | 179/18 EB |
| 4,282,408 A | 8/1981 | Stauers ................... | 179/18 FA |
| 4,438,511 A | 3/1984 | Baran .......................... | 370/19 |
| 4,665,514 A | 5/1987 | Ching et al. .................. | 370/60 |
| 4,679,227 A | 7/1987 | Hughes-Hartogs ........... | 379/98 |
| 4,723,267 A | 2/1988 | Jones et al. .................... | 379/93 |
| 4,731,816 A | 3/1988 | Hughes-Hartogs ........... | 379/98 |
| 4,757,495 A | 7/1988 | Decker et al. ................. | 370/76 |
| 4,771,425 A | 9/1988 | Baran et al. ................... | 370/85 |
| 4,782,512 A | 11/1988 | Hutton ......................... | 379/98 |
| 4,819,228 A | 4/1989 | Baran et al. ................... | 370/85 |
| 4,833,706 A | 5/1989 | Hughes-Hartogs ........... | 379/98 |

(List continued on next page.)

FOREIGN PATENT DOCUMENTS

| | | |
|---|---|---|
| EP | 0677941 A2 | 7/1995 |
| JP | 62084646 | 4/1987 |
| JP | 62222755 | 9/1987 |
| JP | 6376648 | 4/1988 |
| JP | 02271763 | 11/1990 |
| JP | 04100367 | 4/1992 |
| WO | WO 86/02796 | 5/1986 |
| WO | WO 95/20282 | 7/1995 |
| WO | WO 96/04729 | 2/1996 |
| WO | WO 97/37458 | 10/1997 |

OTHER PUBLICATIONS

"Utopia Specification Level 1, Version 2.01," (af–phy–0017.000), *The ATM Forum Committee*, Mar. 21, 1994, 19 pages.

Horst Hessenmuller, et al., Zugangsnetztrukturen für interaktive Videodienste (Teil 1), *Fernmelde Ingenieur, Der*, vol. 48, No. 8, XP000647017, Aug., 1994, Germany, pp. 1–32 (with English translation). Sep. 1994.

Horst Hessenmüller, et al., Zugangsnetzstrukturen für interaktive Videodienste (Teil ), *Fernmelde–Ingenieur*, vol. 48, No. 9, XP000619688, Sep., 1994, Germany, pp. 1–28 (with English Translation).

Anthony Alles, "ATM Internetworking," *Cisco Systems, Inc.*, May 1995, 59 pages.

"Utopia Level 2, Version 1.0," (af–phy–0039.000), *The ATM Forum Committee*, Jun. 1995, 69 pages.

*Primary Examiner*—Huy D. Vu
*Assistant Examiner*—Inder Mehra
(74) *Attorney, Agent, or Firm*—Baker Botts L.L.P.

(57) ABSTRACT

A method and apparatus are provided for generating parity for communication between a physical layer device and an ATM layer device is provided. A data bus is monitored for data comprising an ATM cell transmitted from a physical layer device to an ATM layer device. The header error check of the ATM cell is verified and parity for the ATM cell is generated. Parity is provided to the ATM layer device if the header error check is correct.

17 Claims, 1 Drawing Sheet

U.S. PATENT DOCUMENTS

| | | | |
|---|---|---|---|
| 4,841,561 A | 6/1989 | Hill | 379/97 |
| 4,903,261 A | 2/1990 | Baran et al. | 370/94.2 |
| 4,949,355 A | 8/1990 | Dyke et al. | 375/10 |
| 4,975,906 A | 12/1990 | Takiyasu et al. | 370/85.13 |
| 4,980,897 A | 12/1990 | Decker et al. | 375/38 |
| 4,985,889 A | 1/1991 | Frankish et al. | 370/94.1 |
| 5,020,058 A | 5/1991 | Holden et al. | 370/109 |
| 5,025,469 A | 6/1991 | Bingham | 379/98 |
| 5,054,034 A | 10/1991 | Hughes-Hartogs | 375/8 |
| 5,059,925 A | 10/1991 | Weisbloom | 331/1 A |
| 5,072,449 A | 12/1991 | Enns et al. | 371/37.1 |
| 5,088,032 A | 2/1992 | Bosack | 395/200 |
| 5,115,431 A | 5/1992 | Williams et al. | 370/94.1 |
| 5,119,402 A | 6/1992 | Ginzburg et al. | 375/17 |
| 5,119,403 A | 6/1992 | Krishnan | 375/39 |
| 5,128,945 A | 7/1992 | Enns et al. | 371/37.1 |
| 5,134,611 A | 7/1992 | Steinka et al. | 370/79 |
| 5,185,763 A | 2/1993 | Krishnan | 375/39 |
| 5,198,818 A | 3/1993 | Samueli et al. | 341/144 |
| 5,199,071 A | 3/1993 | Abe et al. | 379/38 |
| 5,202,884 A | 4/1993 | Close et al. | 370/94.1 |
| 5,206,886 A | 4/1993 | Bingham | 375/97 |
| 5,214,650 A | 5/1993 | Renner et al. | 370/110.1 |
| 5,222,077 A | 6/1993 | Krishnan | 375/39 |
| 5,224,099 A | 6/1993 | Corbalis et al. | 370/94.2 |
| 5,228,062 A | 7/1993 | Bingham | 375/97 |
| 5,247,347 A | 9/1993 | Litteral et al. | 358/85 |
| 5,255,291 A | 10/1993 | Holden et al. | 375/111 |
| 5,274,631 A | 12/1993 | Bhardwaj | 370/60 |
| 5,274,635 A | 12/1993 | Rahman et al. | 370/60.1 |
| 5,274,643 A | 12/1993 | Fisk | 370/94.1 |
| 5,282,155 A | 1/1994 | Jones | 364/724.19 |
| 5,285,474 A | 2/1994 | Chow et al. | 375/13 |
| 5,293,402 A | 3/1994 | Crespo et al. | 375/14 |
| 5,295,159 A | 3/1994 | Kerpez | 375/38 |
| 5,313,454 A | 5/1994 | Bustini et al. | 370/13 |
| 5,317,562 A | 5/1994 | Nardin et al. | 370/16 |
| 5,331,670 A | 7/1994 | Sorbara et al. | 375/111 |
| 5,337,348 A | 8/1994 | Yamazaki et al. | 379/94 |
| 5,339,355 A | 8/1994 | Mori et al. | 379/94 |
| 5,341,474 A | 8/1994 | Gelman et al. | 395/200 |
| 5,345,437 A | 9/1994 | Ogawa | 370/13 |
| 5,359,592 A | 10/1994 | Corbalis et al. | 370/17 |
| 5,367,540 A | 11/1994 | Kakuishi et al. | 375/103 |
| 5,371,532 A | 12/1994 | Gelman et al. | 348/7 |
| 5,379,441 A | 1/1995 | Watanabe et al. | 395/800 |
| 5,390,239 A | 2/1995 | Morris et al. | 379/93 |
| 5,394,394 A | 2/1995 | Crowther et al. | 370/60 |
| 5,400,322 A | 3/1995 | Hunt et al. | 370/19 |
| 5,404,388 A | 4/1995 | Eu | 379/24 |
| 5,408,260 A | 4/1995 | Arnon | 348/6 |
| 5,408,522 A | 4/1995 | Ikehata et al. | 379/98 |
| 5,408,614 A | 4/1995 | Thornton et al. | 395/275 |
| 5,410,264 A | 4/1995 | Lechleider | 327/311 |
| 5,410,343 A | 4/1995 | Coddington et al. | 348/7 |
| 5,414,455 A | 5/1995 | Hooper et al. | 348/7 |
| 5,414,733 A | 5/1995 | Turner | 375/233 |
| 5,422,876 A | 6/1995 | Turudic | 370/15 |
| 5,422,880 A | 6/1995 | Heitkamp et al. | 370/60 |
| 5,428,608 A | 6/1995 | Freeman et al. | 370/60.1 |
| 5,430,715 A * | 7/1995 | Corbalis et al. | 370/392 |
| 5,430,793 A | 7/1995 | Ueltzen et al. | 379/93 |
| 5,434,863 A | 7/1995 | Onishi et al. | 370/85.13 |
| 5,440,335 A | 8/1995 | Beveridge | 348/13 |
| 5,442,390 A | 8/1995 | Hooper et al. | 348/7 |
| 5,452,306 A | 9/1995 | Turudic et al. | 370/110.1 |
| 5,453,779 A | 9/1995 | Dan et al. | 348/7 |
| 5,461,415 A | 10/1995 | Wolf et al. | 348/7 |
| 5,461,616 A | 10/1995 | Suzuki | 370/79 |
| 5,461,624 A | 10/1995 | Mazzola | 370/85.13 |
| 5,461,640 A | 10/1995 | Gatherer | 375/231 |
| 5,469,495 A | 11/1995 | Beveridge | 379/56 |
| 5,473,599 A | 12/1995 | Li et al. | 370/16 |
| 5,473,607 A | 12/1995 | Hausman et al. | 370/85.13 |
| 5,475,735 A | 12/1995 | Williams et al. | 379/59 |
| 5,477,263 A | 12/1995 | O'Callaghan et al. | 348/7 |
| 5,479,447 A | 12/1995 | Chow et al. | 375/260 |
| 5,495,483 A | 2/1996 | Grube et al. | 370/95.1 |
| 5,504,736 A | 4/1996 | Cubbison, Jr. | 370/13 |
| 5,504,753 A | 4/1996 | Renger et al. | 371/20.1 |
| 5,506,868 A | 4/1996 | Cox et al. | 375/222 |
| 5,509,006 A | 4/1996 | Wilford et al. | 370/60 |
| 5,513,251 A | 4/1996 | Rochkind et al. | 379/93 |
| 5,517,488 A | 5/1996 | Miyazaki et al. | 370/16 |
| 5,519,704 A | 5/1996 | Farinacci et al. | 370/85.13 |
| 5,528,585 A | 6/1996 | Cooley et al. | 370/56 |
| 5,546,379 A | 8/1996 | Thaweethai et al. | 370/17 |
| 5,555,244 A | 9/1996 | Gupta et al. | 370/60.1 |
| 5,561,663 A | 10/1996 | Klausmeier | 370/17 |
| 5,561,669 A | 10/1996 | Lenney et al. | 370/60.1 |
| 5,570,360 A | 10/1996 | Klausmeier et al. | 370/60 |
| 5,574,724 A | 11/1996 | Bales et al. | 370/68.1 |
| 5,583,862 A | 12/1996 | Callon | 370/397 |
| 5,583,872 A | 12/1996 | Albrecht et al. | 370/476 |
| 5,598,406 A | 1/1997 | Albrecht et al. | 370/296 |
| 5,598,581 A | 1/1997 | Daines et al. | 395/872 |
| 5,600,712 A | 2/1997 | Hanson et al. | 379/142 |
| 5,602,902 A | 2/1997 | Satterlud et al. | 379/59 |
| 5,604,741 A | 2/1997 | Samueli et al. | 370/402 |
| 5,612,957 A | 3/1997 | Gregerson et al. | 370/401 |
| 5,617,417 A | 4/1997 | Sathe et al. | 370/394 |
| 5,617,421 A | 4/1997 | Chin et al. | 370/402 |
| 5,631,897 A | 5/1997 | Pacheco et al. | 370/237 |
| 5,632,021 A | 5/1997 | Jennings et al. | 395/306 |
| 5,642,347 A * | 6/1997 | Buckland | 370/242 |
| 5,649,001 A | 7/1997 | Thomas et al. | 379/93.07 |
| 5,666,353 A | 9/1997 | Klausmeier et al. | 370/230 |
| 5,668,857 A | 9/1997 | McHale | 379/93.07 |
| 5,673,265 A | 9/1997 | Gupta et al. | 370/432 |
| 5,678,004 A | 10/1997 | Thaweethai | 595/187.01 |
| 5,687,176 A | 11/1997 | Wisnienski et al. | 370/476 |
| 5,691,997 A | 11/1997 | Lackey, Jr. | 371/53 |
| 5,729,546 A | 3/1998 | Gupta et al. | 370/434 |
| 5,732,079 A | 3/1998 | Castringo | 370/362 |
| 5,737,364 A | 4/1998 | Cohen et al. | |
| 5,737,526 A | 4/1998 | Periasamy et al. | 395/200.06 |
| 5,737,635 A | 4/1998 | Daines et al. | 395/872 |
| 5,740,171 A | 4/1998 | Mazzola et al. | 370/392 |
| 5,740,176 A | 4/1998 | Gupta et al. | 370/440 |
| 5,742,604 A | 4/1998 | Edsall et al. | 370/401 |
| 5,742,649 A | 4/1998 | Muntz et al. | 375/371 |
| 5,751,710 A | 5/1998 | Crowther et al. | 370/423 |
| 5,756,280 A | 5/1998 | Soora et al. | 455/4.2 |
| 5,764,636 A | 6/1998 | Edsall | 370/401 |
| 5,764,641 A | 6/1998 | Lin | 370/412 |
| 5,765,032 A | 6/1998 | Valizadeh | 395/200.65 |
| 5,770,950 A | 6/1998 | Zurcher et al. | 326/30 |
| 5,781,617 A | 7/1998 | McHale et al. | 379/93.14 |
| 5,787,070 A | 7/1998 | Gupta et al. | 370/217 |
| 5,787,255 A | 7/1998 | Parlan et al. | 395/200.63 |
| 5,793,763 A | 8/1998 | Mayes et al. | 370/389 |
| 5,793,978 A | 8/1998 | Fowler | 395/200.56 |
| 5,793,987 A | 8/1998 | Quackenbush et al. | 395/280 |
| 5,796,732 A | 8/1998 | Mazzola et al. | 370/362 |
| 5,799,017 A | 8/1998 | Gupta et al. | 370/419 |
| 5,802,042 A | 9/1998 | Natarajan et al. | 370/255 |
| 5,805,595 A | 9/1998 | Sharper et al. | 370/442 |
| 5,812,618 A | 9/1998 | Muntz et al. | 375/372 |
| 5,812,786 A | 9/1998 | Seazholtz et al. | 395/200.63 |
| 5,822,383 A | 10/1998 | Muntz et al. | 375/362 |
| 5,835,036 A | 11/1998 | Takefman | 341/95 |

| | | | | | | |
|---|---|---|---|---|---|---|
| 5,835,481 A | 11/1998 | Akyol et al. ................. 370/216 | | 5,864,542 A | 1/1999 | Gupta et al. ................. 370/257 |
| 5,835,494 A | 11/1998 | Hughes et al. ............... 370/397 | | 5,867,666 A | 2/1999 | Harvey .................. 395/200.68 |
| 5,835,725 A | 11/1998 | Chiang et al. .......... 395/200.58 | | 5,889,778 A * | 3/1999 | Huscroft et al. ............. 370/395 |
| 5,838,915 A | 11/1998 | Klausmeier et al. ... 395/200.45 | | 6,188,692 B1 * | 2/2001 | Huscroft et al. ............. 370/395 |
| 5,838,994 A | 11/1998 | Valizadeh .................... 395/876 | | | | |
| 5,852,655 A | 12/1998 | McHale et al. ........... 379/93.14 | | * cited by examiner | | |
| 5,859,550 A | 1/1999 | Brandt ....................... 327/156 | | | | |

METHOD AND APPARATUS FOR GENERATING PARITY FOR COMMUNICATION BETWEEN A PHYSICAL LAYER DEVICE AND AN ATM LAYER DEVICE

BACKGROUND OF THE INVENTION

Asynchronous transfer mode (ATM) communication systems are widely used for network communications. In general, ATM communication protocols involve logical stacks having several layers including a physical layer as the lowest layer. The ATM physical layer typically involves the movement of cells between source and target physical layer devices. The cells are often moved across a bus in smaller parallel sets of data. When the data reaches the target device, the cell is reconstructed and then sent up the stack to its final destination.

One example of an ATM physical layer protocol is the UTOPIA 2 protocol. Devices can use UTOPIA 2 protocol and a UTOPIA 2 bus to move data between the physical layer and an ATM layer device. An ATM layer device can comprise, for example, a UTOPIA 2 master device. In UTOPIA 2 protocol, data is moved from an initial physical layer device, to a UTOPIA 2 master device, and then to a target device. In such a protocol, the UTOPIA 2 master can check for parity on the data received by the UTOPIA 2 master. However, some physical layer devices do not have the ability to generate parity for the transmitted data.

SUMMARY OF THE INVENTION

In accordance with the present invention, a method and apparatus for generating parity for communication between a physical layer device and an ATM layer device is disclosed that provides significant advantages over prior developed systems.

According to one aspect of the present invention, a method for generating parity for data transmitted between a physical layer device and an ATM layer device is provided. The method comprises monitoring a data bus for data comprising an ATM cell transmitted from a physical layer device to an ATM layer device. The method further comprises verifying the header error check of the ATM cell, generating parity for the ATM cell, and providing the parity to the ATM layer device if the header error check is correct.

In one embodiment, the method also includes monitoring an address bus to identify that the physical layer device requires parity to be generated.

In another embodiment, the method further includes setting an error signal if the header error check is incorrect.

According to another aspect of the present invention, an apparatus is provided for generating parity for data transmitted between a physical layer device and an ATM layer device. The apparatus comprises an interface coupled to a data bus. The interface is operable to monitor the data bus for data comprising an ATM cell transmitted from a physical layer device to an ATM layer device. The apparatus further comprises a controller coupled to the interface. The controller is operable to verify the header error check of the ATM cell and generate parity for the ATM cell. A parity output is coupled between the controller and the ATM layer device. The parity output can provide the parity to the ATM layer device if the header error check is correct.

It is a technical advantage of the present invention that it provides parity for physical layer devices that do not have the capability to generate parity when communicating with an ATM layer device.

It is a further technical advantage of the present invention that it provides an additional path integrity check for data communicated between physical layer devices and an ATM layer device.

Other technical advantages should be apparent to one of ordinary skill in the art in view of the specification, claims, and drawings.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
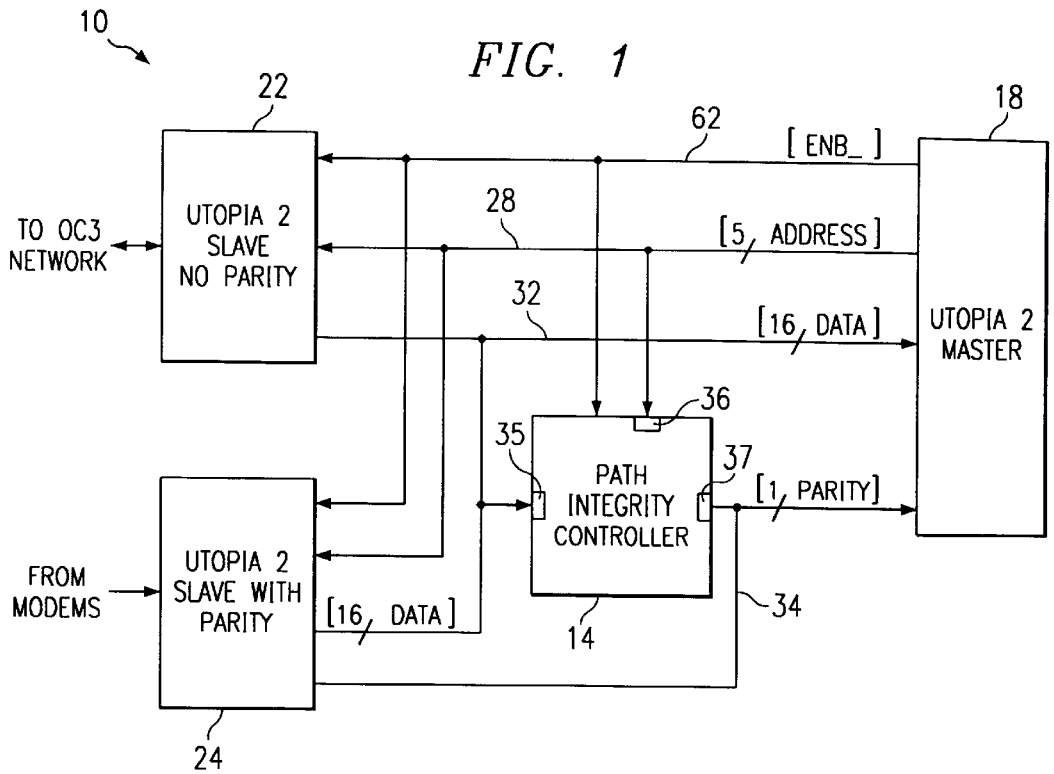
FIG. 1 is a block diagram of one embodiment of a system including a controller for generating parity according to the present invention.

FIG. 1 is a block diagram of one embodiment of a system, indicated generally at 10, that includes a controller 14 for generating parity according to the present invention. A bus master 18 is coupled to physical layer devices (PHYs) 22 and 24 via address bus 28 and data bus 32. Bus master 18 is further coupled to PHYs 22 and 24 and controller 14 via enable 62. Bus master 18 is one example of an ATM layer device. The present embodiment is described with respect to bus master 18, but those skilled in the art will recognize operability with other ATM layer devices. Parity line 34 is coupled between PHY 24 and bus master 18. In the embodiment of FIG. 1, PHY 22 is not coupled to parity line 34. Controller 14 is coupled to address bus 28, data bus 32, and parity line 34. Controller 14 includes an interface 35 coupled to data bus 32, a parity output 37 coupled to parity line 34, and an address interface 36 coupled to address bus 28. Controller 14 and each component can comprise, for example, a complex programmable logic device (CPLD) programmed to operate as described below.

In one implementation, system 10 can comprise a system operating on a UTOPIA 2 bus. In such an embodiment, bus master 18 can comprise a UTOPIA 2 bus master. Physical layer devices 22 and 24 could comprise UTOPIA 2 bus slaves. Address bus 28 can comprise a 5 bit address bus, and data bus 32 can comprise a 16 bit data bus.

In operation, system 10 could reside, for example, on a network interface card of an Asynchronous Transfer Mode (ATM) network. PHY 24 could include an interface to a Digital Subscriber Line (XDSL) modem, such as described by patent application entitled "RECEIVE AND TRANSMIT BLOCKS FOR ASYNCHRONOUS TRANSFER MODE (ATM) CELL DELINEATION", by Hann, et al, filed Aug. 14, 1998. PHY 22 could comprise an OC3 framer. PHY 22 and PHY 24 both communicate data to bus master 18. Furthermore, bus master 18 includes an input for parity line 34. Bus master 18 sets enable 62 to "low" to indicate that a physical layer device is permitted to transmit data on the bus. PHY 24 is coupled to parity line 34 and can generate parity for data transferred between PHY 24 and bus master 18. However, PHY 22 lacks a similar capability.

Further in operation, controller 14 through interface 35 monitors data bus 32 and address bus 28 through address interface 36. As data is transferred from PHY 24 or PHY 22 to bus master 18, controller 14 can identify the data when enable 62 is "low." The data can comprise, for example, ATM cells which include a header portion. The header portion generally includes a header error check (HEC). The HEC can be a cyclic redundancy code (CRC) of the first four bytes placed in the fifth byte of the header. Thus, as ATM cells are transferred between PHYs 22 and 24 and bus master 18, controller 14 verifies the HEC of each cell. Controller 14 can do so, for example, by computing a CRC over the first four bytes of the header, and comparing this computed CRC with the CRC in the fifth byte of the header. If controller 14 detects bad data based upon this comparison, controller 14 can set an error signal (not shown in FIG. 1).

In addition, controller 14 can, when necessary, generate parity and provide parity on parity line 34 through parity output 37. For example, controller 14 can recognize when a predetermined physical layer device needs parity to be generated. In the example of FIG. 1, PHY 22 is such a physical layer device. Controller 14 can recognize when parity is necessary by monitoring address bus 28 through address interface 36. If the signals on address bus 28 indicate that PHY 22 is the transmitter of data on data bus 32, controller 14 can, in addition to verifying the HEC on the data, generate parity for the data. If the HEC is correct, controller 14 provides correct parity to bus master 18 on parity line 34. In addition, controller 14 can set incorrect parity on parity line 34 if the HEC is incorrect. Bus master 18 will then discard the data because of bad parity.

It is a technical advantage of the present invention that it provides parity for physical layer devices that do not have the capability to generate parity when communicating with a bus master device.

It is a further technical advantage of the present invention that it provides an additional path integrity check for data communicated between physical layer devices and a bus master device.

Figure 2:
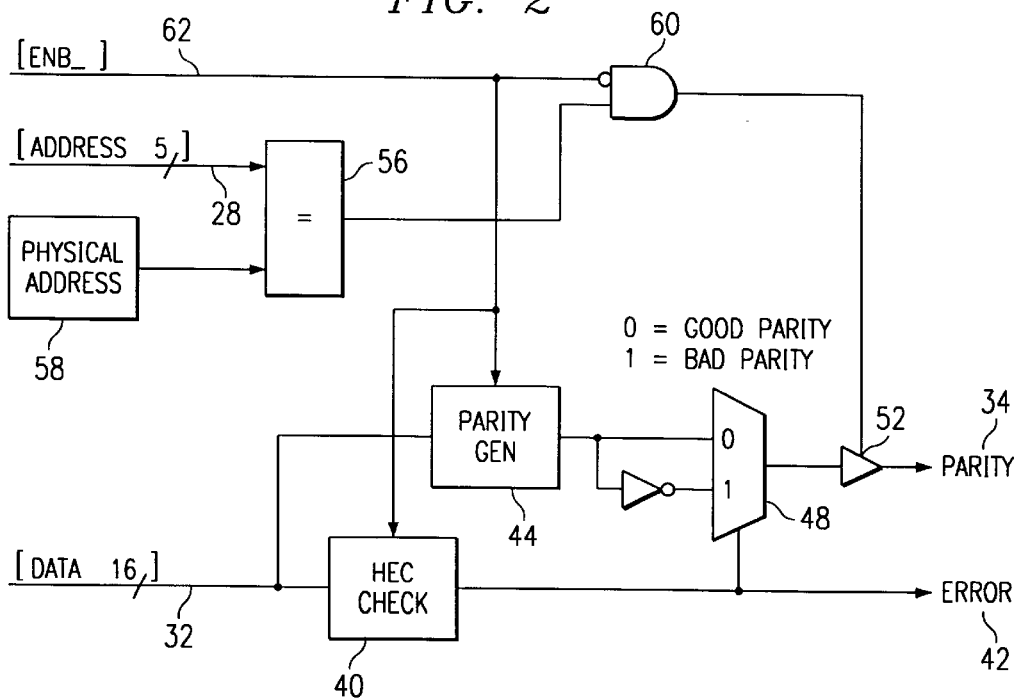
FIG. 2 is a logic diagram of one embodiment of a method for generating parity for communication between a physical layer device and an ATM layer device according to the present invention.

FIG. 2 is a logic diagram of one embodiment of a method for generating parity for communication between a physical layer device and an ATM layer device according to the present invention. Enable 62, address bus 28, and data bus 32 are inputs into a controller operating according to the method of the present invention.

At block 40, data on data bus 32 is monitored and HEC is verified for an ATM cell if enable 62 is "low." For example, HEC can be verified by computing a CRC over the first four bytes of the header of the ATM cell and by comparing this computation with the CRC in the fifth byte of the ATM cell header. If an error is detected, error signal 42 is set. At block 44, parity for the data received is generated if enable 62 is "low." At block 48, the method determines if good or bad parity will be delivered to the bus master device on parity line 34. If an error is detected at block 40, block 48 will select as an output the lower path, meaning parity is inverted when supplied to block 52. If no error is detected at block 40, block 44 will provide good parity to block 52.

In the embodiment of FIG. 2, parity is only provided on parity line 34 under predetermined conditions. Specifically, at block 56, the address on address bus 28 is compared to a predetermined address 58. Predetermined address 58 corresponds to a physical layer device that requires parity to be generated. The results of block 56 is further "anded" at block 60 with inverted enable 62. If enable 62 is "low", meaning data is properly transmitted on the bus, and the output of block 56 indicates a correct address, the output of block 60 enables the output of block 52. This, in turn, allows the parity provided at block 48 to be provided to bus master via parity line 34.

Although the present invention has been described in detail, it should be understood that various changes, substitutions and alterations can be made thereto without departing from the spirit and scope of the invention as defined by the appended claims.

What is claimed is:

1. A method for generating parity for data transmitted between a physical layer device and an ATM layer device, the method comprising:

monitoring a data bus for data comprising an ATM cell transmitted from a physical layer device to an ATM layer device;

verifying the header error check of the ATM cell;

generating parity for the ATM cell; and providing the parity to the ATM layer device if the header error check is correct.

2. The method of claim 1, further comprising generating incorrect parity for the cell to the ATM layer device if the header error check is incorrect.

3. The method of claim 1, further comprising setting an error signal if the header error check is incorrect.

4. The method of claim 1, further comprising monitoring an address bus to identify that the physical layer device requires parity to be generated.

5. The method of claim 1, wherein verifying the header error check comprises:

identifying a header portion of the ATM cell;

calculating a cyclic redundancy check over a four byte portion of the header portion; and comparing the calculated cyclic redundancy check with a fifth byte of the header portion.

6. The method of claim 1, wherein the ATM layer device comprises a bus master device.

7. A method for generating parity for data transmitted between a physical layer device and an ATM layer device, the method comprising:

monitoring a data bus for data comprising an ATM cell transmitted from a physical layer device to an ATM layer device;

verifying the header error check of the ATM cell;

setting an error signal if the header error check is incorrect;

monitoring an address bus to identify that the physical layer device requires parity to be generated;

generating parity for the ATM cell; and providing the parity to the ATM layer device if the header error check is correct.

8. The method of claim 7, further comprising generating incorrect parity for the cell to the ATM layer device if the header error check is incorrect.

9. The method of claim 7, wherein verifying the header error check comprises:

identifying a header portion of the ATM cell;

calculating a cyclic redundancy code over a four byte portion of the header portion; and comparing the calculated cyclic redundancy code with a fifth byte of the header portion.

10. The method of claim 7, wherein the ATM layer device comprises a bus master device.

11. An apparatus for generating parity for data transmitted between a physical layer device and an ATM layer device, the apparatus comprising:

an interface coupled to a data bus, the interface operable to monitor the data bus for data comprising an ATM cell transmitted from a physical layer device to an ATM layer device;

a controller coupled to the interface, the controller operable to verify the header error check of the ATM cell and generate parity for the ATM cell; and a parity output coupled between the controller and the ATM layer device for providing the parity to the ATM layer device if the header error check is correct.

12. The apparatus of claim 11, wherein the controller is further operable to generate incorrect parity for the cell to the ATM layer device if the header error check is incorrect.

13. The apparatus of claim 11, further comprising an error output coupled to the controller, wherein the controller is operable to indicate an error on the error output if the header error check is incorrect.

14. The apparatus of claim 11, further comprising an address interface for monitoring an address bus to identify that the physical layer device requires parity to be generated.

15. The apparatus of claim 11, wherein the controller verifies the header error check by:

identifying a header portion of the ATM cell;

calculating a cyclic redundancy check over a four byte portion of the header portion; and comparing the calculated cyclic redundancy check with a fifth byte of the header portion.

16. The apparatus of claim 11, wherein the interface, the controller, and the parity output comprise one complex programmable logic device.

17. The apparatus of claim 11, wherein the ATM layer device comprises a bus master device.

* * * * *